United States Patent [19]

Lukas

[11] Patent Number: 4,852,244
[45] Date of Patent: Aug. 1, 1989

[54] OPTICAL FIBER STRIPPING AND BREAKING APPARATUS

[75] Inventor: Helmut H. Lukas, Carleton Place, Canada

[73] Assignee: Northern Telecom Limited, Montreal, Canada

[21] Appl. No.: 117,816

[22] Filed: Nov. 6, 1987

[51] Int. Cl.$^4$ .................................................. B26F 3/00
[52] U.S. Cl. .................................... 29/566.3; 29/564.4; 225/96.5; 81/9.51
[58] Field of Search ................. 29/564.3, 564.4, 564.6, 29/564.8, 566.1, 566.3; 225/96, 96.5; 81/9.51

[56] References Cited

U.S. PATENT DOCUMENTS

| | | |
|---|---|---|
| 3,999,269 | 11/1976 | Holt . |
| 4,046,298 | 9/1977 | Schroeder, Jr. ............... 81/9.51 |
| 4,084,310 | 4/1978 | Dragisic ....................... 29/564.4 |
| 4,216,004 | 8/1980 | Brehm et al. .................. 225/96.5 |
| 4,413,763 | 11/1983 | Lukas .......................... 225/96.5 |
| 4,463,886 | 8/1984 | Thornton ....................... 225/96.5 |
| 4,565,310 | 1/1986 | Krause ......................... 225/96.5 |
| 4,607,775 | 8/1986 | Krause ......................... 225/96.5 |

Primary Examiner—Bruce Y. Arnold
Assistant Examiner—J. P. Ryan
Attorney, Agent, or Firm—Parks, Thompson & MacGregor

[57] ABSTRACT

An apparatus for preparing an optical fiber for connection to another optical fiber is comprised of a clamp for gripping an optical fiber at a first location, a mechanism for transversely severing and removing insulation from a predetermined length of the fiber to provide a insulation severed end portion and a bared fiber portion, a cleaving mechanism for forming a transverse score in the bared fiber portion at a predetermined distance from the severed end portion of the insulation, and a fiber tensioning mechanism for breaking the optical fiber along a transverse plane containing the score.

23 Claims, 8 Drawing Sheets

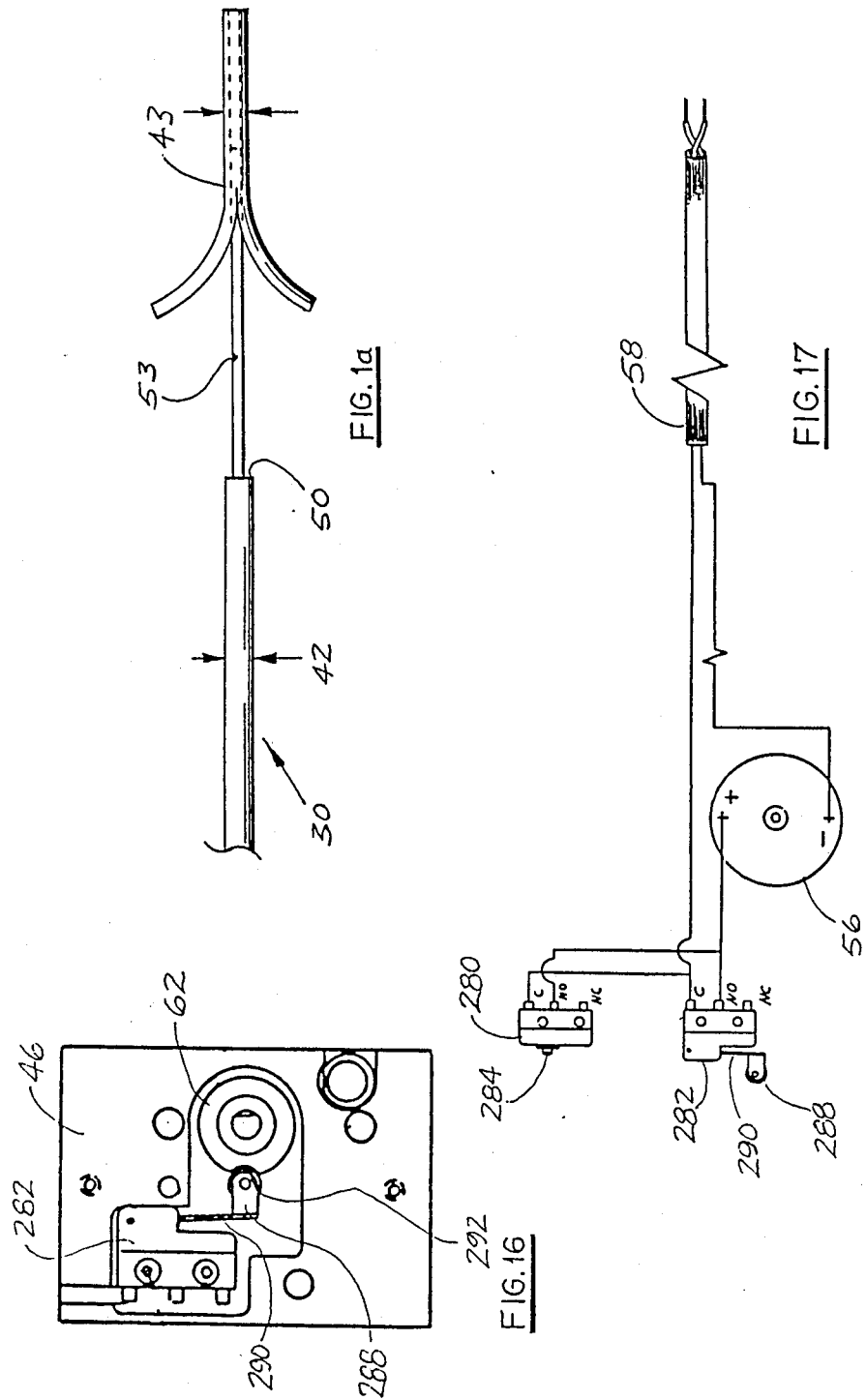

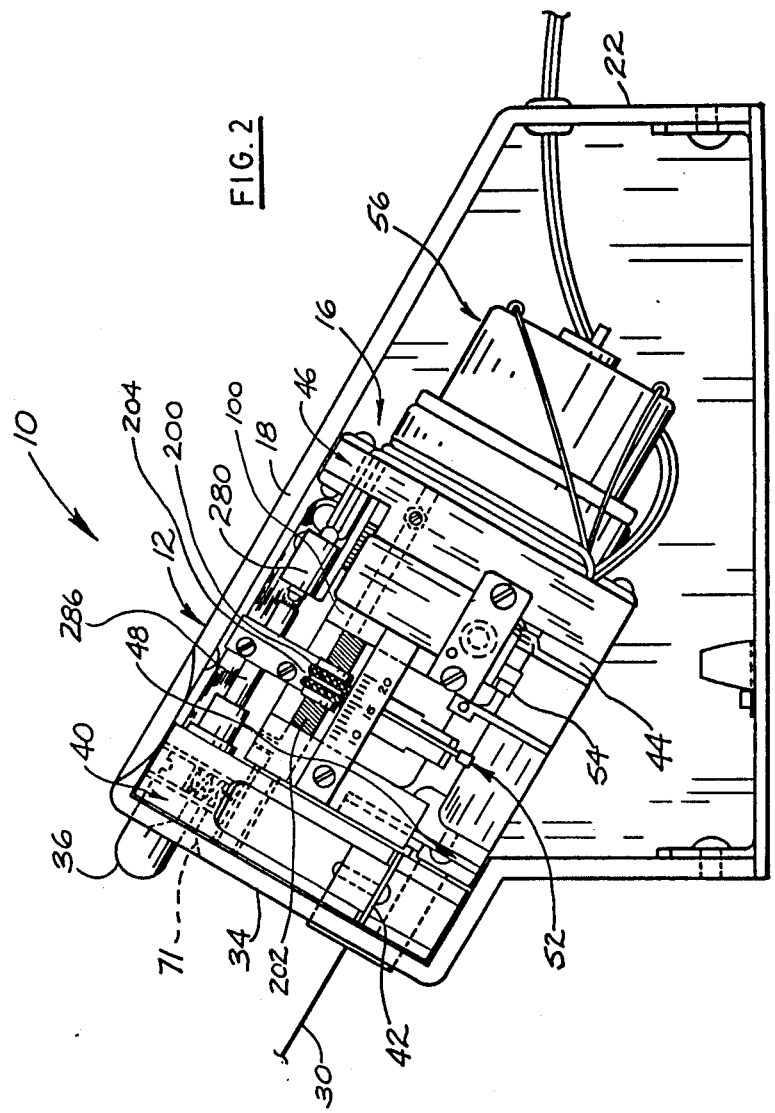

OPTICAL FIBER STRIPPING AND BREAKING APPARATUS

The present invention relates to an apparatus for preparing an optical fiber for connection to another optical fiber and, more specifically, to an apparatus for stripping insulation from a portion of the length of an optical fiber and cleaving the bared fiber core at a predetermined distance for the severed portion of insulation.

BACKGROUND OF THE INVENTION

The preparation of the end of an optical fiber for connection to another fiber in end-to-end relation involves, in general, the stripping of the insulation from the end of the fiber and then cutting or cleaving the bared portion of the fiber to a predetermined length. As is well known in this field, the cutting or cleaving process is very important if good optical characteristics are to be maintained through the fused joint between two fiber ends. To facilitate this aspect of the process, various fiber cleaving or cutting devices have been developed and used.

U.S. Pat. No. 4,168,026 granted to HELMUT H. LUKAS et al on Sept. 18, 1979 discloses a tool for breaking an optical fiber comprising an elongate base member and an elongate top member pivotally connected at a rear end of the base member. An elongate cam member slides longitudinally of the base member and is actuated by pivoting the top member. A front pair of opposed gripping jaws are provided at the front end of the base member while a further rear pair of gripping jaws are spaced from the front jaws. A bending member is positioned between the two pairs of jaws. Pivoting of the top member towards the base member actuates the cam member which in turn first closes the front jaws and then the rear jaws. The rear jaws then pivot rearwardly to tension the fiber and then the bending member moves up to cause the fiber to bend over an arcuate top surface. Finally, a pivotally mounted scoring member in the top member is actuated to sweep a sharp edge across the fiber to initiate a crack which propagates across the fiber. This patent does not describe any means for removing insulation from the optical fiber.

U.S. Pat. No. 3,934,733 granted to EDWIN L. CHINNOCK ET AL on Jan. 27, 1976 discloses a hand tool for breaking optical fibers. The tool establishes a decreasing tensile stress across a cross section of an optical fiber which, at all points, is greater than zero but less than the threshold stress at which a mist zone forms. This is achieved by simultaneously applying a longitudinal tension to the rod and bending the rod. This patent does not disclose any mechanism for removing insulation from the optical fiber.

U.S. Pat. No. 4,017,013 granted to HAWK ET AL on Apr. 12, 1987 discloses an apparatus for severing the ends of a plurality of parallel optical fibers so that the end faces thereof are relatively flat, are substantially perpendicular to the fiber axis and are relatively co-planar. The fibers are bent over an arcuate surface and are slidably clamped between the flat surfaces of two pieces of rubbery material. The clamp is urged by a spring in such a direction that the fibers are in tension. After one fiber is scored and breaks, the clamp automatically slides along the remaining fibers until the clamping force on those fibers is sufficient to prevent further sliding. The fibers are individually severed in this manner. This patent does not disclose any mechanism for removing insulation from the optical fiber.

U.S. Pat. No. 4,036,419 granted to HENSEL ET AL on July 19, 1977 discloses a device for severing an optical fiber and comprises at least one fiber clamp for holding a portion of the fiber against an anvil, means for applying a constant force to the anvil independently of displacement of the anvil so that a preset tension is applied to the optical fiber. A knife is provided for engaging the fiber and initiating a fracture through the fiber. This patent does not disclose any mechanism for removing insulation from an optical fiber.

U.S. Pat. No. 4,154,385 granted to ADOLPH L. LEWIS on May 15, 1979 discloses a hand-held, manually operated tool for severing single filament, fiber optic cable. The tool is formed with a pair of handles which when squeezed together cause a fiber optic cable to be firmly gripped and positioned on an anvil member where it may be scored by a sharpened hard element such as a diamond point of a selectively predetermined point along the axis of the fiber optic cable. Further actuation of the tool causes the gripping members to be pivoted away from each other and thus part the fiber optic cable at the selectively predetermined point. This patent does not disclose any mechanism for removing insulation from the fiber optic cable.

U.S. Pat. No. 4,159,793 granted to BELMONTE ET AL on June 3, 1979 discloses a tool for preparing the ends of an optical fiber prior to such operations as coupling and splicing. The tool is adapted for single-handed operation and comprises a pair of manually actuated handles, first and second fiber supporting surfaces and a third fiber supporting surface between the first and second surfaces. The optical fiber is secured to the first and second surfaces by a pair of clamping members which are responsive to the squeezing of the handles. Once the optic fiber is secured to the surfaces, further squeezing of the handles produces separating rotation of a pair of jaw members to put the fiber under tensile stress. A cutting blade suspended above the third surface is released to produce a peripheral microcrack on a portion of the optical fiber lying on the third fiber supporting surface. The induced stress and curved support of the fiber act in combination to propagate the microcrack diametrically through the fiber so that an appropriate fiber end is obtained. This patent does not disclose any mechanism for removing insulation from the optical fiber cable.

U.S. Pat. No. 4,229,876 granted to JOHN S. DOTY on Oct. 28, 1980 discloses a combination fiber breaker and connector apparatus and method involving clamping an optical connector element to the optical fiber before breaking is effected and then removably securing the connector element to the breaker at a known position which is correlated to the location of a scoring blade and to the characteristics of the connector. The fiber is then clamped, bent, tensioned and scored in response to a single squeezing and releasing motion by one hand of the operator. The scoring is effected by a hard mounted tungsten carbide blade which moves in an arcuate path towards and across the tension fiber. The patent does not disclose any mechanism for removing insulation from an optical fiber.

U.S. Pat. No. 4,315,584 granted to FRIEDRICH WUESTNER on Feb. 16, 1982 discloses a method and device for cutting or breaking a plurality of optical fibers contained in a cable. The device comprises an anvil positioned between a pair of common clamps for holding the optical fibers in parallel to each other. At least one of the clamps is movable. Means is provided for applying a force to the movable clamp to provide an axial tensile force. Further means is provided for applying a vertical force to each of the optical fibers positioned on the anvil at a point on the side of the anvil opposite the movable clamp and means is positioned at the anvil for notching the fibers on the anvil for separating the fibers at the notches. This patent does not disclose any mechanism for removing insulation from the optical fiber.

HELMUT H. LUKAS Canadian Pat. No. 1,166,217 issued on Apr. 24, 1984, discloses a method and an apparatus for breaking an optical fiber which comprises two spaced members each having locating means to locate an optical fiber against longitudinal movement. The spaced members are relatively movable to increase the spacing between the locating means in the direction of the longitudinal axis of the fiber. Means is provided for scoring the fiber transversely to its length between the spaced locating means to produce a score and means for urging the spaced locating means apart to apply to the fiber, after, but not during, the scoring step, tension which is sufficient to cause a crack to propagate completely across the fiber and during the scoring step to produce in the fiber a tension of a level insufficient to cause the fiber to sever on scoring. As with the preceding patents, this patent does not disclose any means for removing insulation from an optical fiber.

Heretofore, the insulation stripping operation has been effected manually using conventional, manual insulation removing tools in the form of pliers. This operation requires care and dexterity and can be relatively time consuming. In addition, the insulation is often not stripped as neatly as it should be and/or the bared portion of the fiber is nicked which means that the process must be repeated. Thus, some skill and practice is required in order to properly and proficiently prepare an optical fiber for use. There is, therefore, a need for an apparatus which automates not only the cleaving operation but also the insulation stripping operation.

SUMMARY OF THE INVENTION

In accordance with the present invention, there is provided an apparatus for preparing an optical fiber for connection to another optical fiber comprising a clamp for gripping an optical fiber at a first location, a mechanism for transversely severing and removing insulation from a predetermined length of the fiber to provide an insulation severed end portion and a bared fiber portion, a cleaving mechanism for forming a transverse score in the bared fiber portion at a predetermined distance from the severed end portion of the insulation, and a fiber tensioning mechanism for breaking the optical fiber along a transverse plane containing the score.

BRIEF DESCRIPTION OF THE DRAWINGS

These and other features of the invention will become more apparent from the following description in which reference is made to the appended drawings, wherein:

FIG. 1a is an enlarged, elevational view of the end of an optical fiber after it has been stripped and scored but before it has been broken;

FIG. 2 is a left side elevation view, with the housing in cross-section, illustrating the operating mechanism in a retracted position;

FIG. 7a is an enlarged view of the stripper blades in an open position with an optical fiber disposed in a fiber cavity formed therebetween;

FIG. 7b is a cross-sectional view taken along line 7b—7b of FIG. 7a;

FIG. 16 is a right side view of the carriage assembly illustrating one of two microswitches used to activate the drive motor; and FIG. 17 is an electrical schematic illustrating the circuit containing the two microswitches and motor.

DESCRIPTION OF PREFERRED EMBODIMENT

Figure 1:
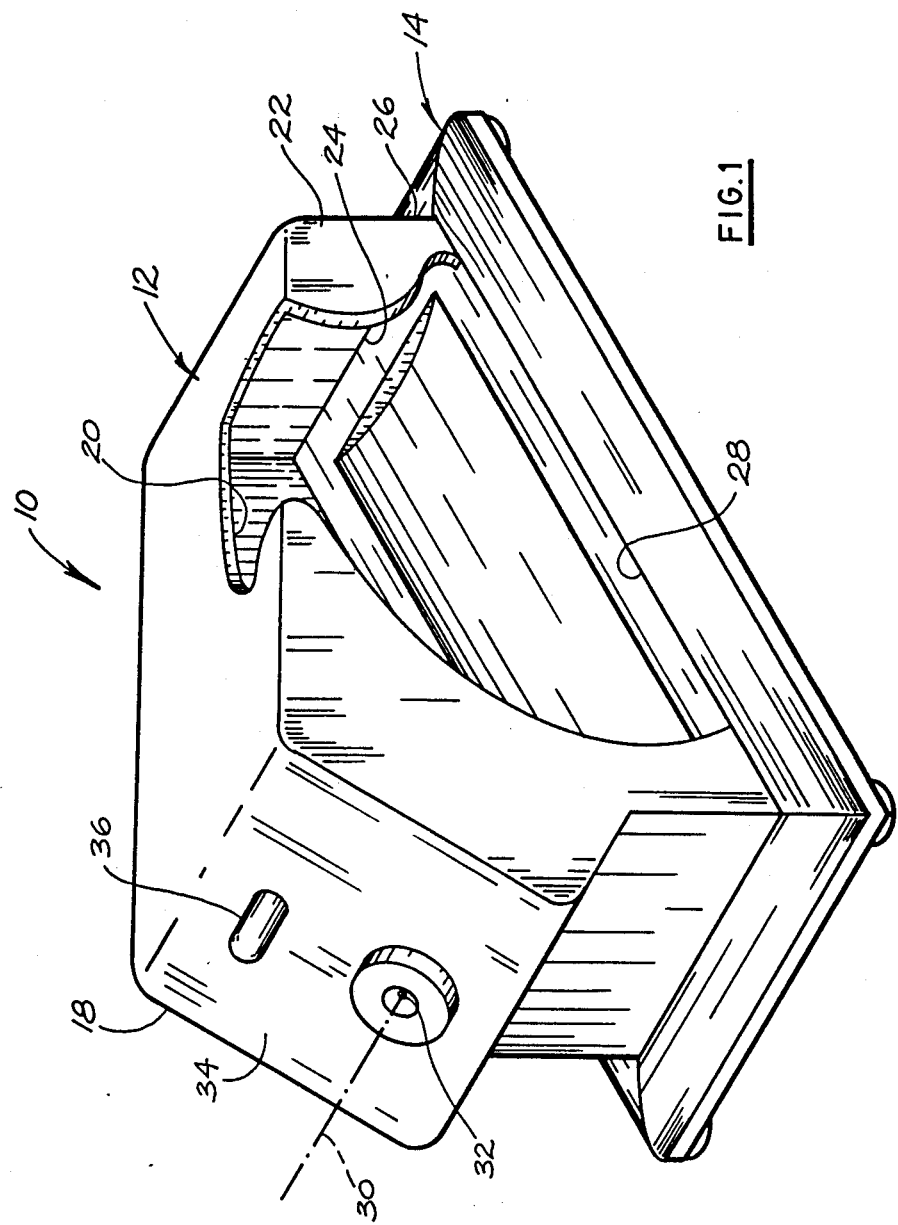
FIG. 1 is a partially broken, perspective view illustrating a housing and base of the preferred embodiment.

With reference to FIG. 1 of the drawings, the preferred embodiment of the present invention, generally designated by reference numeral 10, includes a housing 12 and a base 14. A mechanism 16 is disposed within and secured to the housing and is operable to prepare an optical fiber in a manner explained in detail below.

Housing 12 is a thin-walled body having an upper end portion 18 defining a chamber 20 adapted to receive and fixedly secure mechanism 16 therein and a generally rectangular, tubular lower end portion or chute 22 having an opening 24 at its bottom end 26. As best shown in FIG. 1, base 14 is adapted to sit on a horizontal surface and is formed with a rectangular recess 28 adapted to telescopically receive the bottom end 26 of housing 12 and collect therein optic fiber and insulation debris which drops under gravity from the upper end portion of the housing, through chute 22 and opening 24. The base may be resiliently and removably secured to the housing, as by spring clips or the like, to permit emptying of the recess.

The upper end portion of the housing is generally parallelepiped in shape and inclined at a convenient angle with respect to chute 22 to facilitate insertion of the end of an optic fiber 30 to be processed into an aperture 32 in front face 34 of the housing. An actuating button 36 protrudes from the front face of the housing and, when depressed, activates mechanism 16 and commences a cycle of operation of the apparatus. Each cycle of operation generally includes firstly gripping or clamping the optical fiber against longitudinal movement at a location thereof spaced from the inner or proximate end of the fiber, secondly transversely severing the insulation, but not the fiber core, and stripping a length of insulation from the plane of severance of the insulation toward the proximate end of the fiber to provide a bared fiber portion, thirdly scoring the bared fiber portion at a predetermined distance from the plane of severance of the insulation, fourthly gripping or clamping the fiber at a second location on the fiber on the side of the score remote from the first mentioned location, fifthly tensioning the fiber to an extent sufficient to break or cleave the fiber along a transverse plane containing the score and sixthly ejecting the optic fiber and insulation debris which, as explained above, falls through chute 22, opening 24 and collected in recess 28.

Mechanism 16 will now be described by reference to FIGS. 2-5. The mechanism includes a first fiber clamp means 40 secured to the housing for clamping an optical fiber 30 (see FIG. 1a) at a first location 42 thereon spaced from end 43 of the fiber. A carriage 46 is secured to the housing for movement toward and away from first clamp means 40 longitudinally of the length of optical fiber 30 secured by first clamp means 40. A stripping means 48 is secured to the carriage for removing insulation from at least a portion of the fiber intermediate location 42 and end 43 of the fiber and providing a bared optical fiber portion and an insulation severed end 50. A scoring means 52 is secured to and movable with the carriage for forming a score 53 in the bared end portion of the fiber at a predetermined distance from the plane 50 of severance of the insulation. A second fiber clamp means 54 is secured to and movable with the carriage for clamping the fiber on the side of the score remote from first location 42. The mechanism further includes an electric motor 56 adapted to be connected to a source of d.c. current by means of electrical conductors 58. The motor rotatably drives a shaft 60 to which is secured a cam 62 illustrated in FIGS. 11-13.

Figures 4, 5, 6, 6A:
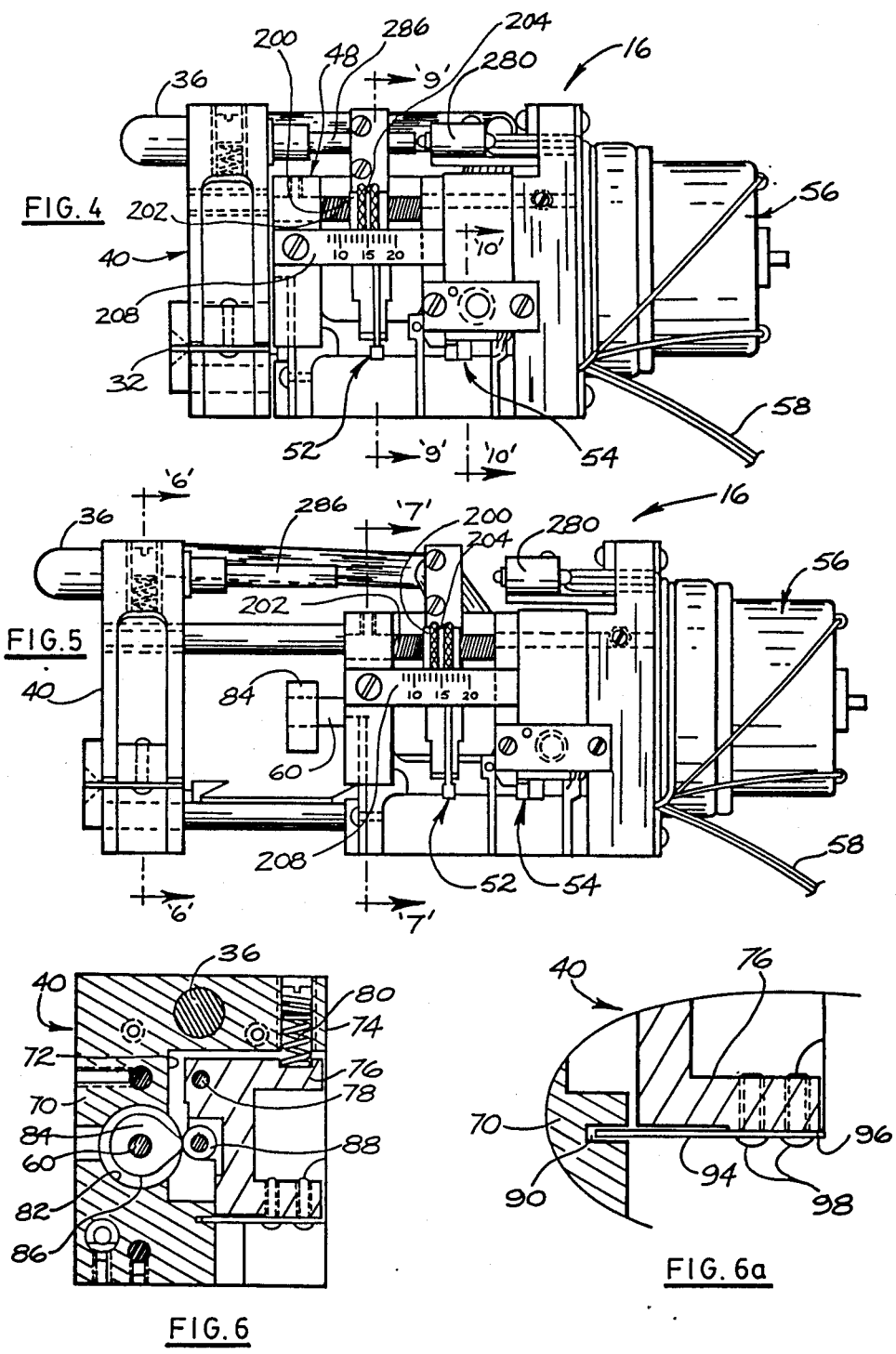
FIG. 4 is a left side elevation view illustrating the operating mechanism in a retracted position.
FIG. 5 is a left side elevation view illustrating the operating mechanism in an extended position.
FIG. 6 is a transverse cross-sectional view taken along line 6—6 of FIG. 5 and illustrating the first clamp mechanism.
FIG. 6a is an enlarged, broken, transverse cross-sectional view illustrating the clamping components of the first clamp mechanism.

With reference to FIGS. 6 and 6a, the first clamp means 40 comprises a mounting block 70 fixedly secured to front wall 34 of the housing by screws 71 (FIG. 2). Block 70 is formed with a cavity 72 in side edge 74 to receive a clamp body 76 in sliding fit relation therein. Clamp body 76 is secured to the mounting block by a hinge pin 78 to permit the clamp body to pivot with respect to the mounting block in a plane extending transversely of the path of the optical fiber as will become clearer below. The clamp body is movable between a fiber clamping position, shown in FIG. 6, and an unclamped position (not shown). A coiled compression spring 80 biases the clamp body toward its clamping position.

Mounting block 70 is further formed with a throughbore 82 for receiving a cam 84, secured to shaft 60, and having a cam surface 86 engageable with a cam follower 88 secured to clamp body 76. Cam surface 86 is profiled to move the clamp body from its clamped position to its unclamped position once every revolution of the shaft to thereby permit an optical fiber to be inserted into and removed from the mechanism.

As also shown in FIGS. 6 and 6a, the mounting block is formed with a channel 90 for receiving a length of optical fiber 30. Channel 90 is in the form of a narrow slot which extends longitudinally through block 70 and opens in a side surface 92 of cavity 72. A clamp member or blade 94 is removably and adjustably secured to the underside 96 of the clamp body by screws 98 and is adapted to extend into the channel for clamping an optical fiber disposed therein against the inner end surface of the channel. As explained more fully later, the operating mechanism is arranged such that cam 84 is in the position shown in FIG. 6 at the beginning and end of each cycle of operation to allow an optical fiber to be inserted and removed from the mechanism. During the entire cycle of operation, the clamp body and clamping blade are in their clamping positions securely holding an optical fiber in position while the end of the fiber is stripped of insulation, cleaved and broken.

Stripping mechanism 48, cleaving mechanism 52, second clamp means 54, motor 56 and their associated components are secured to a carriage 100 (see also FIG. 3) which, in turn, is mounted on a pair of guide pins 102 secured to and extending rearwardly from mounting block 70 so that the carriage can move longitudinally toward and away from the mounting block 70 during each cycle of operation.

Figure 7:
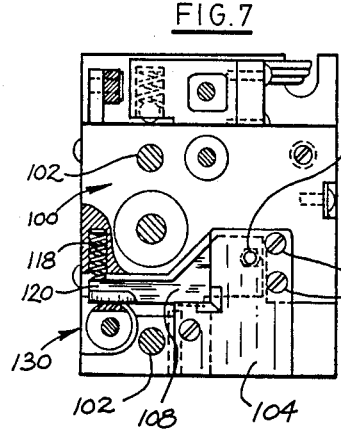
FIG. 7 is a transverse cross-sectional view taken along line 7—7 of FIG. 5 illustrating a movable stripper blade of the insulation stripping mechanism in a raised position.
Figures 7A, 7B:
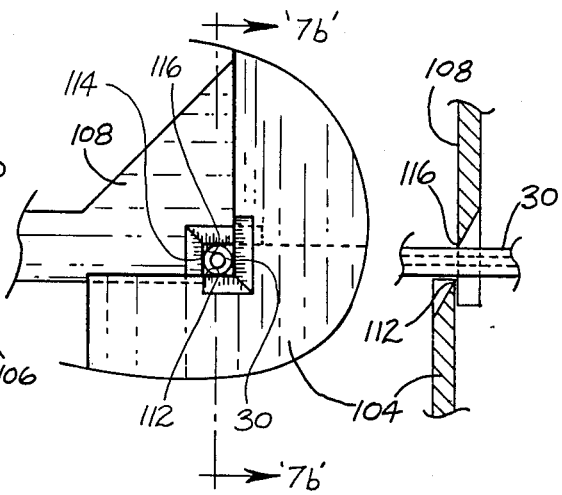
Figure 8:
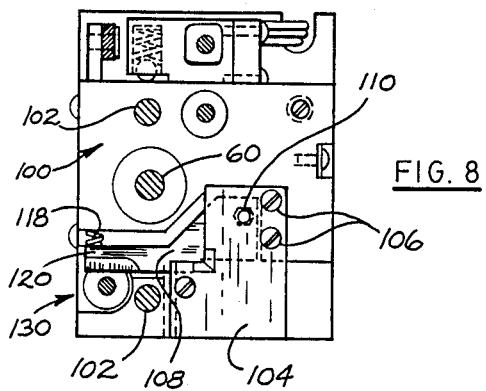
FIG. 8 is a view similar to that of FIG. 7 but showing the movable blade in a lowered, insulation severing position.

With reference to FIGS. 7, 7a and 8, the insulation stripping means 48 is comprised of a fixed stripper blade 104 secured to carriage 100 by mounting screws 106 and a movable or active stripper blade 108 pivotally secured to the fixed stripper blade 104 by an eccentric pivot adjustment pin 110 for movement toward and away from the fixed stripper blade. Stripper blades 104 and 108 are formed with opposed cutting edges 112 and 114, respectively, extending transversely of and disposed on opposite sides of an optical fiber 30 and defining an optical fiber insulation stripping cavity 116 (FIG. 7a). As explained hereinafter, the cutting edges are operable to sever opposed sides of the insulation of a fiber disposed between them and are movable with the carriage longitudinally of said fiber toward the proximal end thereof whereby to remove insulation from at least a portion of the fiber.

Stripper blade 108 is movable between a first position, shown in FIG. 8, whereat cutting edge 114 is co-operable with cutting edge 112 to sever insulation on the optical fiber and a second position, shown in FIG. 7, removed from the first position, whereat the two cutting edges are disposed in non-cutting relation. A resilient bias means in the form of a coiled compression spring 118 urges end 120 remote from pivot pin 110 toward the fixed stripper blade and, therefore, into cutting relation therewith. The movable stripper blade actuating mechanism 130 for moving the movable stripper blade from its first or cutting position to its second or non-cutting position will now be described with reference to FIG. 3.

Movable stripper blade actuating mechanism 130 includes a stationary shaft 132 having one end 134 secured to mounting block 70 and its other end 136 formed with a stop 138. Shaft 132 extends longitudinally rearwardly of the mounting block, parallel to the direction of movement of the carriage, and is disposed in an elongated recess 140 formed in the back side of carriage 100. A pick-up sleeve 142 is secured to the shaft for holding the movable stripper blade in its second (non-cutting) position while the carriage is disposed in its initial, retracted position. A pick-up drum 144 is secured to the shaft for longitudinal sliding movement therealong and is formed with a cam surface 146 which smoothly merges into a pick-up sleeve carrying surface 148 having a circumferential groove 150 therein for receiving and retaining end 120 of movable stripper blade 108.

At the beginning (and end) of each cycle of operation, the carriage will be in its retracted position (FIGS. 2, 3 and 4) and tail end 120 of movable stripper blade will be supported by pick-up sleeve 142. When the carriage is longitudinally displaced away from its initial position and mounting block 70, tail end 120 of the movable stripper blade will slide off of the pick-up sleeve onto shaft 132. In addition, its cutting edge 116 will cut into and sever the top edge of the insulation of the optical fiber which, in turn, will cause the fiber to be urged against cutting edge 112 of fixed stripper blade 104 so as to sever the insulation on the bottom side of the fiber. The pivot point of the movable stripper blade is adjustable so as to ensure that only the insulation and not the fiber itself is severed by the cutting action of the stripper blades. The cutting edges 112 and 116 remain in their cutting positions as the carriage moves rearwardly, towards the extended position (FIG. 5) and, in so doing, strip or remove insulation from the fiber.

Figure 3:
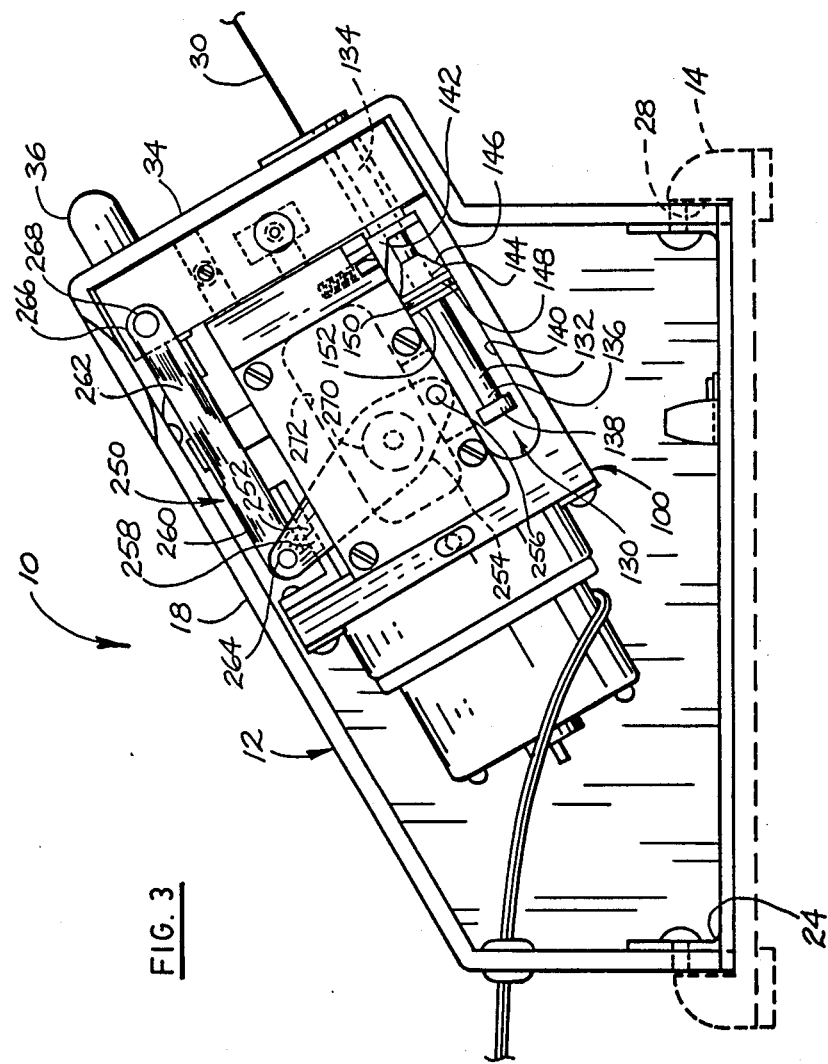
FIG. 3 is a right side elevation view, with the housing in cross-section, illustrating the operating mechanism in a retracted position.
Figure 9:
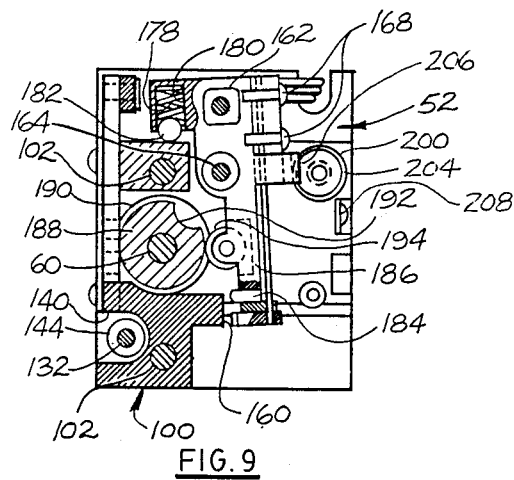
FIG. 9 is a transverse cross-sectional view taken along line 9—9 of FIG. 4 and illustrating the fiber cleaving mechanism.
Figure 9A:
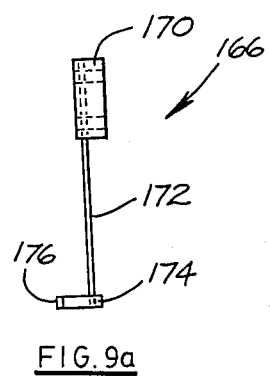
FIG. 9a is a side elevational view of a removable cleaving module.

Meanwhile, tail end 120 of the movable stripper blade slides along shaft 132 and at some point will engage cam surface 146 of pick-up drum 144 and push it rearwardly until its back surface 152 engages stop 130. At that point, tail end 120 rides up onto and slides upwardly along cam surface 146 until it reaches and drops into groove 150 of the drum. At this point, the carriage will have reached its fully extended position and will be returned to its fully retracted position whereat tail end 120 will be transferred to the pick-up sleeve 142. To facilitate this, the front, bottom edge of tail end 120 is tapered as best shown in FIG. 3. It will be understood that the insulation need not and is not stripped to the free end 43 of the fiber. Once the stripping operation has been completed, the bared portion of the fiber is scored as will now be explained with reference to FIGS. 9 and 9a.

Scoring means 52 includes an anvil surface 160 formed on carriage 100 in longitudinal alignment with fiber cavity 116 of the stripping mechanism 48 and channel 90 of the first clamp means 40. A cleaver arm 162 is secured to the carriage by a pivot pin 164 for pivotal movement in a plane extending transversely of the anvil surface and an optical fiber disposed thereon. A flexible scoring blade 166 is replaceably secured to the cleaver arm by mounting screws 168 and comprises a mounting block 170, a lever spring 172 and a diamond blade cutting member 174 having a cutting edge 176 extending transversely of the optical fiber for forming a score in the bared portion of the fiber. The scoring blade is movable with the cleaver arm between a non-scoring position whereat the scoring edge is transversely spaced from a fiber disposed on the anvil surface to a scoring position whereat the scoring edge is urged against an optical fiber disposed on the anvil surface.

A coiled compression spring 178 housed in a blind hole 180 in the cleaver arm and a ball 182 seated on carriage 100 urge or bias the cleaver are toward the fiber scoring position. An adjustable stop 184 is threaded into lower end 186 of the cleaver arm and is engageable with anvil surface 160 to accurately control the depth of the score. A cam 188, having a cylindrical cam surface 190 with a recess 192 therein, is secured to drive shaft 60 and cooperates with a cam follower 194 secured to cleaver arm 162 to keep the cleaver arm in its non-scoring position through most of a cycle of operation. When follower 194 reaches and engages recess 192, the cleaver arm and, therefore, scoring edge 176, move to the scoring position under the action of coiled compression spring 178.

The cleaver arm is longitudinally adjustable with respect to the optical fiber to allow the final length of the bared end portion of the fiber to be precisely predetermined. Thus, with reference to FIGS. 2, 4, 5 and 9, there is provided a thumbwheel 200 threadedly engaged with a longitudinally extending, threaded shaft 202 secured to carriage 100. The thumbwheel is formed with a circumferential ridge 204 received in a slot 206 in the cleaver arm so that rotation of the thumbwheel results in axial displacement thereof along shaft 202, which displacement is transmitted to the cleaver arm by engagement between ridge 204 and slot 206. The cleaver arm is free to slide axially on its pivot pin 164. A plate 208 is also secured to the carriage adjacent the thumbwheel and is provided with a suitable scale indicating the distance to the place of severance of the cutting edges of the stripper blades.

Figure 10:
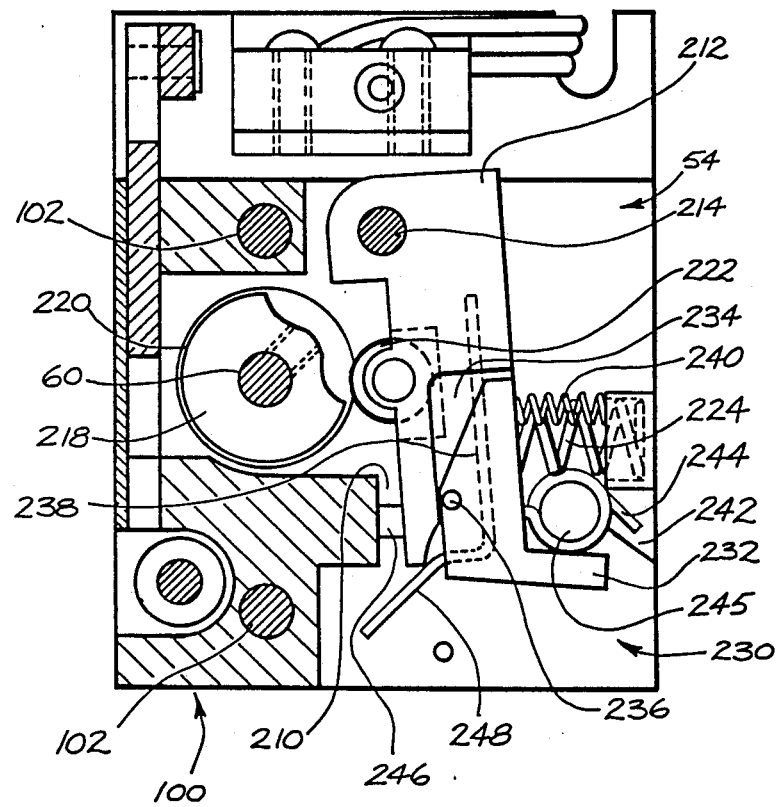
FIG. 10 is a transverse cross-sectional view taken along line 10—10 of FIG. 4 and illustrating the second fiber clamping mechanism and the cleaved fiber knock off mechanism.

Second clamp means 54 will now be described with reference to FIG. 10 of the drawings. Second clamp means 54 includes a stationary clamping surface or jaw 210 formed on carriage 100 in longitudinal alignment with anvil surface 160, fiber cavity 116 of the stripping mechanism 48 and channel 90 of the first clamp means 40. A fiber clamp body 212 is pivotally secured to the carriage by pivot pin 214 for pivotal movement in a plane extending transversely of the direction of movement of the carriage. Clamp body 212 includes a movable clamp surface or jaw 216 in juxtaposition to stationary clamp surface 210. A cam 218 having a camming profile 220 is secured to drive shaft 60 and cooperates with cam follower 222 secured to the clamp body for moving the movable clamping surface 216 away from stationary surface 210 against the action of a coiled compression spring 224 disposed between the carriage and the clamp body. Cam 218 is profiled and arranged to effect clamping of an optical fiber between jaws 210 and 216 during a period of time after the fiber has been scored and while it is tensioned.

A knock-off assembly 230 is provided for cleanly removing debris from mechanism 16. The assembly includes a knock-off lever 232 pivotally secured, by a pivot pin 236, within a notch 234 formed in the side of the fiber clamp body 212. Lever 232 further includes a triangular cut-out portion 238 to permit lever 232 pivot, within limits, within notch 234. A tension spring 240 biases the lever in a clockwise direction as viewed in FIG. 10. A knock-off shaft 242 extends transversely of the plane of the fiber clamp and a torsion spring 244 is disposed about the shaft. The knock-off shaft is formed with a notch 245 adapted to receive the end of knock-off lever 232 and is cooperable therewith for torsioning spring 244. A pair of knock-off fingers 246 are secured to and extend from knock-off shaft 242 above the portion of the fiber which is to be cleaved from the fiber. A fiber pivot wire 248 is secured to and is movable with the fiber clamp body and is disposed below the portion of the fiber which is to be cleaved from the fiber. Thus, when the fiber has been cleaved and broken and clamp body 212 moves away from its clamped position, the knock-off shaft is released allowing spring 244 to quickly pivot knock-off shaft 242 and knock-off fingers 246. The latter apply a downward force against the top side of the fiber. The fiber pivot wire, located on the underside of the fiber, serves as a base for the fiber adjacent the score so as to ensure that the severed end of the fiber is cleanly broken away and removed from the clamping site.

Figure 11:
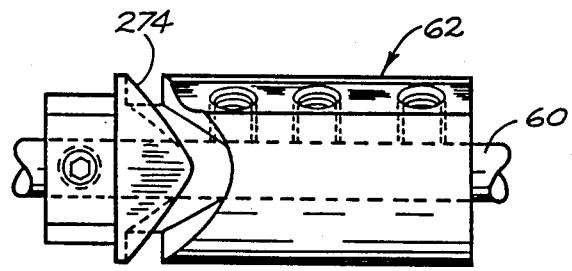
FIGS. 11, 12 and 13 are side elevational views of a cam for actuating various sub-assemblies.
Figure 12:
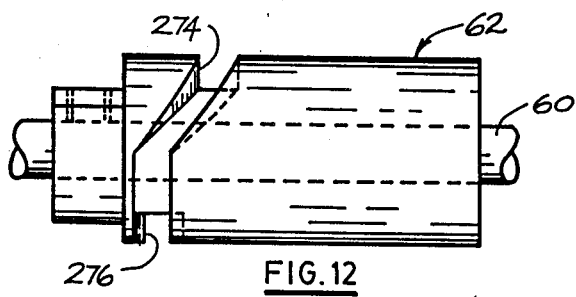
Figure 13:
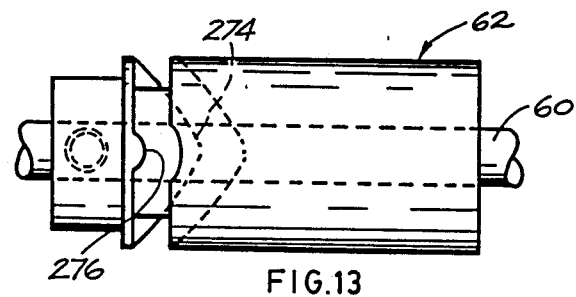

The carriage actuating mechanism 250 will now be described with reference to FIGS. 3 and 11-13. The mechanism includes a stripper arm 252 having one end 254 pivotally secured to the carriage by pivot pin 256 and its other end 258 pivotally secured to the rear end 260 of a connecting rod 262 by pivot pin 264. The front end 266 of rod 262 is pivotally secured to mounting block 70 by a pivot pin 268. A cam follower 270 extends inwardly of an opening 272 in carriage 100 and into engagement with a cam groove 274 (FIGS. 11-13) of cylindrical cam 62 which, as mentioned previously, is secured to shaft 60 driven by motor 56. It will be understood that end 258 of arm 252 will remain longitudinally stationary by virtue of its connection to connecting rod 262. Thus, as the cam rotates, follower 270, and therefore the central portion of the arm, will follow the profile of cam groove 274 which, in turn, will cause the lower end of the arm to apply a longitudinal force to the carriage via pin 256. FIGS. 11 and 12 illustrate the stripping profile which causes movement of the carriage during the stripping operation. Diametrically opposed thereto is a small protrusion or profile 276 which causes a small longitudinal oscillation of the carriage during a period of time when both clamp means 40 and 54 have clamped an optical fiber on opposite sides of the score formed by scoring means 52 and thus subject the fiber to a small tensile load which is sufficient to break the fiber along the transverse plane of the score.

Figure 14:
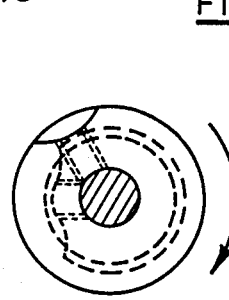
FIG. 14 is an end view of the cam illustrated in FIGS. 11, 12 and 13 and showing the cleaving profile and the rear clamp actuating profile.

Positioned rearwardly of cylindrical cam 62 is cam 218 which actuates the second clamp means 54. FIG. 14 illustrates cam profile 188, as well as, in dotted lines, profile 218.

The apparatus is arranged to undergo a complete cycle of operation during one revolution of the cam shaft simply by depressing button 36 as explained hereinbelow. As best shown in FIGS. 16 and 17, a pair of microswitches 280 and 282 are provided for energizing and de-energizing motor 56. The two microswitches are in parallel relationship with one another and in series with the motor. Microswitch 280 includes an actuating element 284 which is arranged to be actuated by an extension 286 of spring loaded button 36 (see FIGS. 2, 4 and 5). Microswitch 282 is controlled by cam 62 and, to that end, includes a cam follower 288 secured to the end of spring loaded actuating element 290 which maintains the cam follower in engagement with the cam. As shown in FIG. 16, the cam is cylindrical except for a recess 292. The switch is closed when the follower engages the cylindrical portion of the cam and open when it engages the recess. As will become clear below, follower 288 normally engages recess 292. Thus, initially, both microswitches are open and, therefore, the motor is OFF.

When button 36 is depressed, extension 286 of the button depresses actuating element 284 which closes microswitch 280 which, in turn, energizes motor 56 and rotates the cam. Rotation of the cam causes follower 288 to move out of recess 292 onto the cylindrical portion of the cam causing microswitch 282 to close and thereby connecting the motor to the d.c. source independently of microswitch 280. Thus, button 36 can now be released and the motor will remain energized. Button 36 returns to its starting position under the influence of its spring bias (not shown) and microswitch 280 is opened. The motor will remain energized for one complete revolution, i.e. until follower 288 again engages recess 292 at which point microwitch 282 will open.

OPERATION

Figure 15:
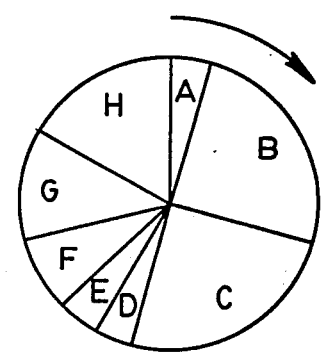
FIG. 15 is a timing diagram.

A complete cycle of operation will now be described with reference to FIGS. 15 and 16.

Before activating mechanism 16, the end of an optical fiber is inserted into the mechanism via funnel aperture 32. At this time, each of clamp means 40 and 54 will be in their respective unclamped positions, the stripper blades will be separated and the scoring blade will be spaced from its associated anvil surface. Thus, there will be a clear, substantial straight longitudinal path within the mechanism to receive the fiber. Initially, tail 120 of the movable stripper blade will be resting on the pick-up sleeve. When button 36 is depressed, microswitch 280 is closed and motor 36 is activated and shaft 60 together with the various cams secured thereto begin to rotate.

During PHASE A, cam 84 rotates away from the position shown in FIG. 6. This allows clamp body 76 to move to its clamping position under the action of spring 80 and thereby securely hold the optical fiber at a location remote from its inner end 43.

During PHASE B, carriage 100 moves rearwardly to its fully extended position by virtue of engagement between cam follower 270 secured to arm 252 (FIG. 3) and the carriage actuating portion of cam profile 274 (FIGS. 11 and 12). During this phase, tail 120 (FIG. 3) of stripper arm 108 moves off of pick-up sleeve 142 onto shelf 132 under the action of spring 118 and slides rearwardly along the shaft until pick-up drum 144 abuts stop 138. At that point, the tail slides upwardly along camming surface 146 and ultimately drops into groove 150 of the puck-up drum. When tail end 120 of the stripper arm 108 falls off of sleeve 142, cutting edges 112 and 116 of stripper arms 104 and 108 transversely engages and severs the fiber insulation, but not the fiber itself. Continued rearward movement of carriage 100 with stripper arm 108 in its cutting position results in the stripping of insulation from the fiber.

During PHASE C, cam profile 274 returns the carriage to its initial, retracted position. As it approaches that position, tail end 120 of the stripper arm is transferred from the pick-up drum to the pick-up sleeve.

During PHASE D, follower 194 associated with arm 162 engages recessed portion 192 of cam 188 causing cutting edge 176 of diamond cutter 174 to form a score in the bared portion of the fiber. Arm 162 thereafter returns to its non-scoring position shown in FIG. 9.

During PHASE E, follower 222 associated with rear fiber clamp body 212 engages the recessed profile portion of cam 220 and body 212 moves to its clamping position under the influence of spring 224 and clamps the proximate end 43 of the fiber between jaws 210 and 216. Rear clamp 54 remains in its clamped position until PHASE G.

During PHASE F, the fiber is tensioned, and breaks, by engagement between follower 270 of arm 252 and protrusion 276 of cam 62 which causes the carriage to move rearwardly slightly and return to its initial position.

During PHASE G, rear clamp 54 opens, knock-off fingers 236 are actuated and the fiber is ejected.

In final PHASE H, the front fiber clamp 40 is opened and the prepared fiber may then be removed. The entire process may then be repeated.

It will be seen that the process of preparing the fiber is extremely simple, fast and accurate and requires little skill. It will be understood that various modifications and alterations may be made without departing from the spirit of the present invention as defined in the appended claims.

The embodiments of the invention in which an exclusive property or privilege is claimed are defined as follows:

1. An apparatus for preparing an optical fiber for connection to another optical fiber, said apparatus comprising:
   a base having a cavity for receiving cleaved optical fiber ends portions;
   a housing having a base engaging portion;
   first fiber clamp means secured to said housing for clamping an optical fiber at a location thereon spaced from an end of said fiber;
   a carriage secured to said housing for movement toward and away from said first clamp means longitudinally of a length of optical fiber secured to said first clamp means;
   stripping means secured to said carriage for removing insulation from at least a portion of said optical fiber intermediate said (position) location and said end of said optical fiber and to provide a bared optical fiber portion and an insulation severed end;
   scoring means secured to and movable with said carriage for forming a score in said bared end portion at a predetermined distance from said insulation severed end;
   second fiber clamp means secured to and movable with said carriage for clamping said optical fiber on a side of said score remote from said first position; and
   cam means for longitudinally tensioning said optical fiber so as to cause said fiber to break along a radial plane containing said score and form a cleaved optical fiber portion.

2. An apparatus as defined in claim 1, said insulation stripping means comprising:
   opposed cutting edge means extending transversely of and disposed on opposite sides of an optical fiber secured to said first clamp means, said cutting edge means being operable to sever opposed sides of the insulation of a fiber disposed therebetween and being movable with said carriage longitudinally of said fiber toward the proximal end thereof whereby to remove insulation from said fiber.

3. An apparatus as defined in claim 2, said cutting edge means including a stationary cutting edge and a movable cutting edge movable toward and away from said stationary cutting edge.

4. An apparatus as defined in claim 1, further including means for operating said first clamp means, said carriage, said stripping means, said scoring means, said second clamp means and said tensioning means in predetermined timed sequence.

5. An apparatus as defined in claim 1, said first clamp means comprising:
   a mounting block secured to said housing and having a channel extending therethrough for receiving a length of optical fiber;
   a clamp body secured to said mounting block for movement relative to said mounting block, said clamp body having a clamp member extending into said channel for clamping an optical fiber disposed therein against a surface of said channel, said clamp blade being movable between a clamping position whereat said clamp member secures an optical fiber in said channel against longitudinal movement and a release position whereat an optical fiber disposed in said channel is free to move longitudinally therein; and
   bias means for urging said clamp blade into a clamping position.

6. An apparatus as defined in claim 5, said bias means including a compression spring disposed between said mounting block and said clamp body.

7. An apparatus as defined in claim 5, further including cam means for actuating said clamp body.

8. An apparatus as defined in claim 1, said carriage means including a carriage body, carriage guide means secured to said housing for guiding said carriage along a linear path toward and away from said first clamp means.

9. An apparatus as defined in claim 8, further including carriage actuating means for moving said carriage along said path between a proximal position whereat said carriage body is proximate said first clamp means to a distal position whereat said carriage body is removed from said first clamp means.

10. An apparatus as defined in claim 9, said carriage actuating means including electric motor means secured to said carriage body, a drive shaft secured to said motor means for rotation therewith, cylindrical cam means secured to said drive shaft and having a cam groove therein and a cam follower extending from said carriage body into said cam groove.

11. An apparatus as defined in claim 10, said carriage actuating means further including an actuating lever having one end pivotally secured to said mounting block, another end pivotally secured to said carriage body and an intermediate portion having said cam follower.

12. An apparatus as defined in claim 11, further including a connecting rod connecting said mounting block and said one end of said lever.

13. An apparatus as defined in claim 1, said scoring means including:
   an anvil surface on said carriage for locating said optical fiber thereon;
   a cleaver arm secured to said carriage for pivotal movement in a plane extending transversely of said anvil surface, a scoring blade on said cleaver arm having a scoring edge for scoring said fiber, said scoring blade being movable with said cleaver arm between a fiber non-scoring position whereat said scoring edge transversely spaced from a fiber disposed on said anvil surface to a scoring position whereat said scoring edge is urged against an optical fiber disposed on said anvil surface.

14. An apparatus as defined in claim 13, further including:

stop means (associated) cooperating with said cleaver arm and said carriage body for controlling the depth of the score formed by said scoring edge.

15. An apparatus as defined in claim 13, further including:
bias means for urging said cleaver arm toward said scoring position and actuating means for maintaining said cleaver arm in said non-scoring position.

16. An apparatus as defined in claim 13, said scoring blade being removably secured to said cleaver arm and further including:
a mounting block removably secured to said cleaver arm and a leaf spring extending from mounting block and carrying said scoring blade.

17. An apparatus as defined in claim 1, said second fiber clamp comprising:
a first clamp surface on said carriage, said surface being longitudinally aligned with a corresponding clamp surface on said first clamp means;
a clamp body having a second clamp surface, said clamp body being secured to said carriage for pivotal movement transversely of said first clamp surface between a non-clamping position whereat said second clamp surface is transversely spaced from a fiber disposed on said first clamp surface to a clamping position whereat said second clamp surface is urged against an optical fiber disposed on said first clamp surface.

18. An apparatus as defined in claim 17, further including:
resilient bias means for urging said clamp body toward said first position thereof; and
actuating means for maintaining said clamp body in said second position for a first predetermined timed interval during a cycle of operation of said apparatus and permitting said bias to urge said second clamp surface against said first clamp surface during a second predetermined timed interval during said cycle whereby to clamp a portion of said fiber between said first and second clamp surfaces.

19. An apparatus as defined in claim 18, said actuating means including a cam rotatably secured to said carriage and having a cam profile and a cam follower secured to said clamp body and resiliently urged against said cam profile by said bias means.

20. An apparatus for preparing an optical fiber for connection to another optical fiber, said apparatus comprising:
a base having a cavity for receiving cleaved optical fiber ends portions;
a housing having a base engaging portion;
first fiber clamp means secured to said housing for clamping an optical fiber at a location thereon spaced from an end of said fiber, said first clamp means having a stationary clamping jaw and a movable clamping jaw movable toward and away from said stationary clamping jaw;
a carriage secured to said housing for movement toward and away from said first clamp means longitudinally of a length of optical fiber secured to said first clamp means;
stripping means secured to said carriage for removing insulation from at least a portion of said optical fiber intermediate said position and said end of said optical fiber and provide a bared optical fiber portion and an insulation severed end, said stripping means including a transverse, stationary insulation cutting edge and a transverse, movable insulation cutting edge movable into and out of cutting relating with said stationary cutting edge, said stationary cutting edge intersecting the longitudinal axis of a straight optical fiber inserted into said apparatus;
scoring means secured to and movable with said carriage for forming a score in said bared end portion at a predetermined distance from said insulation severed end, said scoring means including an anvil surface coplanar with said stationary jaw of said first clamp means, and a scoring edge movable transversely of said anvil surface between a fiber scoring position and a fiber non-scoring position;
second fiber clamp means secured to and movable with said carriage for clamping said optical fiber on a side of said score remote from said first position, said second clamp means including a stationary jaw coplanar with said clamping jaw of said first clamp means and a movable jaw movable toward and away from said stationary clamping jaw;
cam means for longitudinally tensioning said optical fiber so as to cause said fiber to break along a radial plane containing said score and form a cleaved optical fiber portion; and
means for operating said first clamp means, said carriage, said stripping means, said scoring means, said second clamp means and said tensioning means in predetermined timed sequence, said operating means including:
motor means secured to said carriage for longitudinal displacement therewith, said motor means having a drive-shaft secured to said carriage for rotation therein; and
cam means secured to said drive shaft for rotation therewith, said cam means having:
a first cam profile for moving said movable jaw of said first clamp means to said clamping position at the beginning of each cycle of operation and moving said movable clamping jaw to said second position at the end of each cycle;
a second cam profile for moving said movable insulation cutting into cutting relation with said stationary insulation cutting edge into cutting relation after said first clamp means has been moved to said clamping position;
a third cam profile for longitudinally displacing said carriage, after said movable insulation cutting edge has moved into insulation cutting relation with said stationary cutting edge, form an initial position proximate said first clamp means to a distal position longitudinally spaced from said first clamp means and returning said carriage to said initial position;
a fourth cam profile for moving said scoring edge, after said carriage has returned to said initial position, from said non-scoring position to said fiber scoring position and returning said scoring edge to said non-scoring position;
a fifth cam profile for moving, after said scoring edge has been returned to said non-scoring position, said movable jaw of said second clamp means into fiber clamping relation with stationary jaw thereof, whereby said first and second clamp means clamp an optical fiber at locations on opposite sides of a score formed by said scoring means, and moving said movable jaw of said second clamp means away from said stationary jaw after said optical fiber has been broken by said tensioning means; and, a sixth cam profile for longitudinally displacing said carriage away for said first clamp means while said optical fiber is clamped by said first and second clamp means whereby to subject the portion of said optical fiber intermediate said first and second clamp means to a tension sufficient to cause said optical fiber to break.

21. An apparatus as defined in claim 20, said cutting edge means comprising:
 a stationary cutting member secured to said carriage for movement therewith and having a first insulation cutting edge extending transversely of the axis of an optical fiber disposed in said apparatus;
 a movable cutting member secured to said carriage for movement therewith and having a second insulation cutting edge extending transversely of the axis of an optical fiber disposed in said apparatus, said second cutting member being movable between a first position whereat said second cutting is co-operable with said first cutting edge to sever insulation on said optical fiber and a second position removed from said first whereat said first and second cutting edges are disposed in non-cutting relation; and
 (resilient bias means) a compression spring for urging said second cutting member toward said insulation cutting position.

22. An apparatus as defined in claim 21, further including means for actuating said movable cutting member, said actuating means including:
 a shaft secured to said housing and extending parallel to the direction of movement of said carriage, said shaft having a stop thereon;
 a pick-up sleeve secured to said shaft for holding said movable cutting member in said second position thereof while said carriage is disposed in an initial position;
 a pick-up drum secured to said drum for sliding movement therealong having a cam surface thereon smoothly merging to pick-up sleeve carrying surface;
 whereby, as said carriage is longitudinally displaced from said initial position thereof, said cutting member slides off of said pick-up sleeve and is urged to said cutting position by said resilient bias means whereby to sever said insulation of said optical fiber, said second cutting member remaining in said first position as said carriage moves from said initial position to an end of travel thereof and, in so doing, removes insulation from a corresponding length of said fiber, said second cutting member engaging said drum and being operable to slide said drum along said shaft until said drum engages said stop whereupon said second cutting member slides up said cam and onto said carrying surface, said second cutting member being transferred to said pick-up sleeve when said carriage returns to said initial position thereof.

23. An apparatus as defined in claim 22, said carrying surface having a circumferential groove therein for receiving said second cutting member.

* * * * *